United States Patent [19]

Mooney et al.

[11] 3,903,172

[45] Sept. 2, 1975

[54] PROCESS FOR THE REMOVAL OF IRON CARBONYLS FROM ALDEHYDES

[75] Inventors: Edward J. Mooney, Longview, Tex.; Wallace F. Hart, Tulsa, Okla.

[73] Assignee: Eastman Kodak Company, Rochester, N.Y.

[22] Filed: Feb. 19, 1974

[21] Appl. No.: 443,656

Related U.S. Application Data

[63] Continuation-in-part of Ser. No. 154,970, June 21, 1971, abandoned.

[52] U.S. Cl............................................. 260/601 R
[51] Int. Cl.² ........................................ C07D 47/02
[58] Field of Search.......... 260/601 R, 604 OX, 602; 154/970

[56] References Cited
UNITED STATES PATENTS

| | | | |
|---|---|---|---|
| 2,604,491 | 7/1952 | Hale ............................. | 260/604 HF |
| 2,684,385 | 7/1954 | Biribauer et al................ | 260/602 X |
| 2,763,693 | 9/1956 | Vander Woude et al. .... | 260/604 HF |
| 2,963,514 | 12/1960 | Rehn et al. .................... | 260/604 HF |
| 3,094,564 | 6/1963 | Mertzweiller et al. ........ | 260/601 R X |

OTHER PUBLICATIONS

Paulech et al., "Chem. Abst.", Vol. 60, 2775h (1964).

*Primary Examiner*—Donald G. Daus
*Assistant Examiner*—D. B. Springer
*Attorney, Agent, or Firm*—Edward R. Weber; Daniel B. Reece, III

[57] ABSTRACT

Iron carbonyl is removed from an aldehyde stream which comprises isobutyraldehyde, n-butyraldehyde and iron carbonyl. The stream is first separated so as to remove the isobutyraldehyde and iron carbonyl leaving high purity n-butyraldehyde. The isobutyraldehyde and iron carbonyl are then heated to a temperature of from about 185°C. to about 250°C. under a pressure sufficient to maintain the aldehyde in a liquid state. The hot liquid is retained in a holding tank from 15 minutes to 2 hours. Subsequently the solid iron formed from the decomposition of the iron carbonyl is removed by conventional separation means such as filtration. A low color product is produced when the aldehyde stream contains at least 2% by weight of water.

10 Claims, 1 Drawing Figure

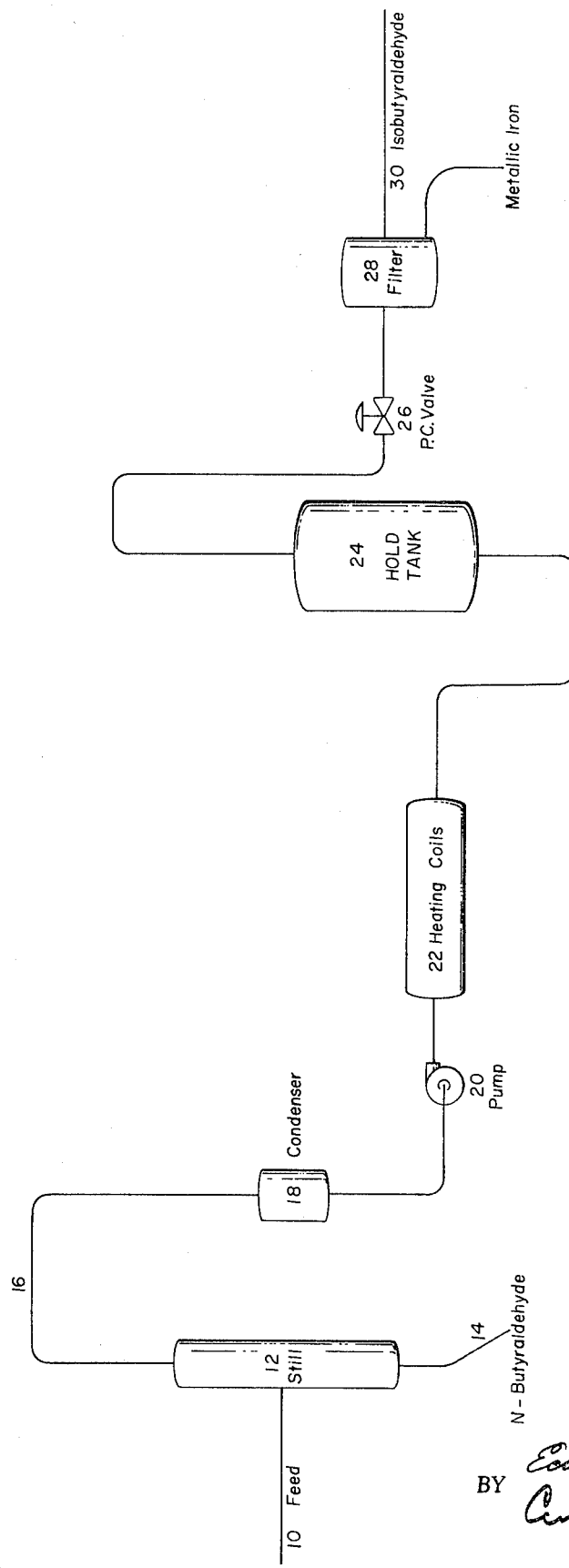

PROCESS FOR THE REMOVAL OF IRON CARBONYLS FROM ALDEHYDES

This application is a continuation-in-part of our copending application Ser. No. 154,970, filed June 21, 1971, now abandoned.

This invention relates to a process for removing metals from a stream containing the metals as carbonyls. More particularly, this invention relates to a process for removing iron carbonyls from a product stream comprising n-butyraldehyde, isobutyraldehyde and iron carbonyls.

During the hydroformylation of olefins, a product stream is produced which contains a mixture of reaction products, unreacted olefins, carbon monoxide and hydrogen. The reaction products may be adjusted to comprise a large proportion of aldehydes having one more carbon atom than the olefin charged and lesser amounts of alcohols, acetyls and other organic products. The reaction product stream also contains certain metallic carbonyls dissolved in the mixture of reaction products and unreacted olefins. These carbonyls consist of carbonyls of a catalytic metal and other carbonyls formed in the process system. Cobalt is one of the more commonly used catalytic metals. The process reaction zone and the pipes associated therewith are usually made of iron alone or combined with certain alloying metals such as nickel, chromium and molybdenum. The reactants slowly dissolved away the walls of the reactor and pipes and thus small quantities of carbonyls, principally comprising iron carbonyl, are introduced into the effluent product stream. Subsequent processing has been discovered for removing the catalytic cobalt carbonyl and many of the other carbonyls. However, when the removal conditions are rigorous enough to remove the iron carbonyl along with the cobalt carbonyl, undesirable product losses occur. If the small quantities of iron carbonyl are not removed, they harm the quality of the product by interfering with subsequent catalytic processing and/or by decomposing to give the end product and undesirable color.

Accordingly, it is an object of the present invention to provide a process for removing residual quantities of iron carbonyl from the aldehyde products without incurring any appreciable loss of reaction product.

A further object is to provide a purified effluent stream which has a commercially acceptable color as produced and does not develop an unacceptable color upon exposure to light and air.

For many years, butyraldehydes produced by hydroformylation have contained residual quantities of iron carbonyl. The iron carbonyl is a volatile colorless compound, but on exposure to light and air it decomposes to give the product stream an unacceptable color. The higher the concentration of the iron carbonyl, the darker the color of the product stream when the iron carbonyl decomposes. A large amount of experimental work has been conducted in an effort to remove these residual quantities of iron carbonyl. The several techniques proposed for removing cobalt carbonyl have been deemed unacceptable, either because the higher temperatures required to decompose the iron carbonyl affected the aldehyde stream and produced an unacceptable percentage of higher boiling compounds or because the techniques, when applied to the decomposition of iron carbonyl, were unacceptably slow. Experimental work wherein attempts were made to decompose the iron carbonyl through use of various known techniques such as ultraviolet exposure, addition of chlorine gas or addition of hydrogen peroxide produced a reduction from the 500 ppm initially charged to 50 to 60 ppm only after 2 to 3 days' reaction time. Such processes were unacceptable both because of the extended reaction period and because the remaining iron carbonyl still produced an undesirable color in the product.

Surprisingly, it has been found that iron carbonyl and the resulting undesirable color can be almost completely removed by heating an aldehyde-iron carbonyl stream to a temperature of from about 185°C. to about 250°C., under pressure sufficient to cause the aldehyde to remain in the liquid state, for a period of from about 15 minutes to about 2 hours. However, when this process was utilized with a mixed stream of normal butyraldehyde and isobutyraldehyde, an unacceptably high percentage of high boiling components was produced. It was further surprisingly discovered that n-butyraldehyde, when separated from the feed stream by conventional distillative techniques, was essentially free of the dissolved carbonyls. The iron carbonyl remained with the isobutyraldehyde stream and, when subsequently the isobutyraldehyde/iron carbonyl stream was exposed to the decarbonyling conditions, substantially no high boiling impurities were formed. A consistently good product color was not obtained, however. Subsequently, it was further discovered that a good product color was produced when water was present to the extent of at least 2% by weight.

In order that the invention may be understood more fully, reference is now made to the accompanying drawing. The drawing illustrates a preferred embodiment of our invention. Referring to the drawing, a feed stream 10, which is the effluent from a hydroformylation process which has been previously decobalted by conventional means and comprises n-butyraldehyde, isobutyraldehyde and iron carbonyl, is fed into a conventional distillation column 12, wherein it is separated to yield a bottoms stream 14 of essentially pure n-butyraldehyde and an overhead stream 16 which comprises isobutyraldehyde and the iron carbonyls contained in the feed stream. Separation obtained is extremely efficient and the n-butyraldehyde stream will be routinely greater than 98% pure and contain less than 1 part per million iron carbonyl. With such a routine separation, the isobutyraldehyde stream will routinely contain less than 1% n-butyraldehyde.

Typically, such a separation can be made in a distillation column operated at a base temperature of from about 65°C. to about 75°C.; a top temperature of from about 55°C. to about 65°C.; and a pressure of from about 0 psig. When operated under these conditions, the n-butyraldehyde bottoms stream will have a purity greater than 99.7% and will contain less than 0.1% isobutyraldehyde and less than 0.1 parts per million iron carbonyl, and the isobutyraldehyde-containing overhead stream will contain less than 0.1% n-butyraldehyde.

The overhead stream 16 consisting of isobutyraldehyde and iron carbonyl and containing less than 1% n-butyraldehyde, is converted into a liquid in condenser 18 and fed by pump 20 into heating coils 22 wherein it is heated to a temperature of from about 185°C. to about 250°C. The pump 20 and pressure control valve 26 cooperate to maintain the aldehyde in a liquid state. From the heating coil 22 the hot stream passes to holding tank 24 where it is retained for a period of about 15 minutes to about 2 hours. After leaving the holding tank 24, the aldehyde passes through pressure control valve 26 and filter 28 wherein the metallic iron formed from the iron carbonyls is removed. It is understood that, even though a filter is shown, this separation may be accomplished by any technique (e.g., flash distillation, magnetic separation, etc.) capable of removing the finely divided metallic iron from the aldehyde stream. The effluent stream 30 comprises isobutyraldehyde having an acceptably low color content. The aldehyde feed stream may contain sufficient water, well in excess of 2%; however, if the feed stream contains less than about 1.9% water, additional water may be suitably added through line 32.

In the drawing sheet the holding tank 24 is shown with the aldehyde entering at the bottom and leaving at the top. However, the tank can also be piped with the aldehyde flowing from top to bottom. As long as the pressure control valve 26 holds a back pressure that is greater than the vapor pressure of the heated aldehydes, the aldehydes cannot vaporize. If the aldehyde is kept in a liquid state, the holding tank may be piped any way without affecting the operation of the system.

EXAMPLES 1 – 9

Different experimental runs 1–9 are made by varying the residence time, holding tank temperature and feedstock. Each run is conducted for a period of at least eight hours. Spot samples and composite samples are continuously taken during each run. The feed samples and the product samples are analyzed for ppm iron. The product samples are further analyzed by chromatography to find percent high boiler content. The results of these experiments, which further illustrate the invention, are presented in Table I.

into separate streams of n-butyraldehyde and isobutyraldehyde. This example illustrates that the decarbonyling action occurs satisfactorily without the aforementioned separation. However, it is noted that an appreciable quantity of undesired high boiling components is formed. These components, which must be subsequently removed, significantly reduce the overall yield of the process. In Examples 2–5, the feed is a stream removed near the top of the distillation column at a point approximating maximum concentration of iron carbonyl. It will be noted that, except for Example 5, satisfactory reduction in iron content and resultant color is obtained. Run five, conducted at a temperature less than the lower temperature limit, produces no improvement. The quantity of high boiling components remains unacceptably high in these examples. In Examples 6, 7 and 8, the feed material is an overhead stream from the distillation column. This stream contains essentially no n-butyraldehyde. It will be noted the percent high boilers formed is drastically reduced. This illustrates the importance of separating the aldehydes before they are treated to decompose the iron carbonyl and the importance of the discovery that the iron carbonyl selectively remains with the isobutyraldehyde. In Example 9, a feed stream which consists of redistilled isobutyraldehyde is run through the process to establish that the higher boilers are being principally formed from the n-butyraldehyde constituents.

EXAMPLES 10 – 13

Additional experimental work performed in perfecting this process disclosed that a good colored product is obtained when the aldehyde stream contains about 2% by weight of water. However, unsatisfactory results occur if the water content is permitted to drop to 1.5%.

TABLE I

| Example | Feed Butyraldehyde Analysis % Iso | Feed Butyraldehyde Analysis % Normal | Hold. Tank Temp. °C. | Weight % Water Present | Residence Time | Weight % High Boilers in Aldehyde Feed | Weight % High Boilers in Aldehyde Product | ppm Iron Feed | ppm Iron Product | APHA Color[1] Feed | APHA Color[1] Product |
|---|---|---|---|---|---|---|---|---|---|---|---|
| 1 | 32 | 68 | 200 | 7–8 | 25 min. | 0 | 6.36 | 13 | 2 | 500 | 5–10 |
|   |    |    |     |     |         | 0 | 6.48 |    |   |     | 5–10 |
|   |    |    |     |     |         | 0 | 5.50 |    |   |     | 5–10 |
| 2 | 64 | 36 | 200 | 7–8 | 50 min. | 0 |      |    |   | 500 | 40–50 |
|   |    |    |     |     |         | 0 | 1.40 |    |   | 500 | 40–50 |
|   |    |    |     |     |         | 0 | 16.10 | 30 | 2 | 500 | 40–50 |
|   |    |    |     |     |         | 0 | 13.50 |    |   | 500 | 40–50 |
|   |    |    |     |     |         | 0 | 0.42 | 79 | 0.2 | 500 | 20–25 |
|   |    |    |     |     |         | 0 | 6.15 | 78 | 0.2 | 500 | 20  25 |
| 3 | 62 | 38 | 200 | 7–8 | 50 min. | 0 | 7.60 | 145 | 4 | 500 | 50–75 |
|   |    |    |     |     |         | 0 | 3.30 |     |   | 500 | 50–75 |
| 4 | 60 | 40 | 200 | 7–8 | 25 min. | 0 | 6.60 | 64 | 6 | 500 | 75–100 |
|   |    |    |     |     |         | 0 | 4.23 |    |   | 500 | 75–100 |
| 5 | 63 | 37 | 175 | 7–8 | 50 min. | 0 | 1.20 | 72 | 98 | 500 | 500 |
|   |    |    |     |     |         | 0 | 3.47 |    |   | 500 | 500 |
| 6 | 99 | 1  | 200 | 10–11 | 50 min. | 0 | 0.40 | 56 | 2 | 500 | 25–30 |
|   |    |    |     |     |         | 0 | 0.39 |    |   | 500 | 25–30 |
| 7 | 99 | 1  | 200 | 10–11 | 25 min. | 0 | 0.63 | 53 | 2 | 500 | 30–40 |
|   |    |    |     |     |         | 0 | 0.42 |    |   | 500 | 30–40 |
| 8 | >99 | <1 | 185 | 10–11 | 50 min. | 0 | 0.38 | 57 | 3 | 500 | 30–40 |
|   |    |    |     |     |         | 0 | 0.31 |    |   | 500 | 30–40 |
| 9 | 99.76 | 0.23 | 200 | 10–11 | 50 min. | 0 | 0.038 |   |   |     |       |
|   |    |    |     |     |         |   | 0.050 |   |   |     |       |
|   |    |    |     |     |         |   | 0.020 |   |   |     |       |

[1] As tested by ASTM D-1209-62 test method (Platinum-Cobalt Scale)

In Example 1, the feed is the effluent stream from a conventional decobalting operation without separation Examples 10–13 are illustrative of this. Data from Examples 10–13 are presented in tabular form in Table II.

TABLE II

| Example | Feed | Feed % H₂O | Feed APHA Color | Product H₂O | Product APHA Color |
|---|---|---|---|---|---|
| 10 | As in Examples 6–8 except for a lower H₂O content | 1.5 | 300–500 | 1.5 | 300–500 |
| 11 | As in Example 10 except for H₂O content | 2.0 | 500 | 2.0 | 5–15 |
| 12 | As in Example 10 | 1.5 | 300–500 | 1.5 | 300–500 |
| 13 | As in Example 10 (0.5% supplemental H₂O is added prior to heating) | 1.5 | 300–500 | 2.0 | 5–30 |

Examples 10, 11 and 12 characterize this effect of water upon the color of the product stream. In Example 13, a feed stream identical to that used in Examples 10 and 12 is used. An additional one-half percent of water is added from an outside source. It will be noted that the color obtained in Example 13 is consistent with the results obtained in Example 11 wherein the feed stream contained 2% water instead of the 1.5% in Examples 10 and 12.

Although the invention has been described in considerable detail with reference to certain preferred embodiments thereof, it will be understood that variations and modifications can be effected without departing from the spirit and scope of the invention as described hereinabove.

We claim:

1. A process for the removal of iron carbonyls from a product stream comprising isobutyraldehyde and n-butyraldehyde which comprises the steps of:
 a. distillative separation of said product stream into a normal butyraldehyde fraction which is essentially free of dissolved carbonyls and an isobutyraldehyde fraction comprising isobutyraldehyde and iron carbonyl, which fraction is essentially free of n-butyraldehyde;
 b. heating the isobutyraldehyde fraction, under pressure sufficient to maintain the aldehyde in a liquid state, to a temperature of from about 185°C. to about 250°C. for a sufficient period of time to decompose the iron carbonyls into metallic iron; and
 c. separating the metallic iron from said isobutyraldehyde fraction.

2. A process according to claim 1 wherein the product stream is produced by the hydroformylation of propylene.

3. A process according to claim 1 wherein the isobutyraldehyde fraction is heated for a period of from about 15 minutes to about 2 hours.

4. A process according to claim 1 wherein the isobutyraldehyde fraction contains about 2% by weight of water.

5. A process according to claim 1 wherein the isobutyraldehyde fraction contains at least 2% by weight of water.

6. A process according to claim 1 wherein the isobutyraldehyde fraction is heated to a temperature of from about 190°C. to about 210°C.

7. A process according to claim 1 wherein the heated isobutyraldehyde fraction is maintained at the increased temperature for a period of from about 25 minutes to about 50 minutes.

8. A process according to claim 1 wherein the metallic iron formed by the decomposition of the iron carbonyl is separated from the isobutyraldehyde fraction by filtration.

9. A process according to claim 1 wherein the metallic iron formed by the decomposition of the iron carbonyl is separated from the isobutyraldehyde fraction by flash distillation of the isobutyraldehyde.

10. A process according to claim 1 wherein the distillative separation is performed in a distillation column at a base temperature of from about 65°C. to about 75°C.; a top temperature of from about 55°C. to about 65°C.; and a pressure of from about 0 psig to about 10 psig.

* * * * *